US012031554B2

(12) United States Patent
Wilkström

(10) Patent No.: US 12,031,554 B2
(45) Date of Patent: Jul. 9, 2024

(54) OPEN IMPELLER FOR SUBMERGIBLE PUMP CONFIGURED FOR PUMPING LIQUID COMPRISING ABRASIVE MATTER

(71) Applicant: Xylem Europe GmbH, Schaffhausen (CH)

(72) Inventor: Jan Wilkström, Sundbyberg (SE)

(73) Assignee: Xylem Europe GmbH, Schaffhausen (CH)

( * ) Notice: Subject to any disclaimer, the term of this patent is extended or adjusted under 35 U.S.C. 154(b) by 0 days.

(21) Appl. No.: 18/026,727

(22) PCT Filed: Sep. 20, 2021

(86) PCT No.: PCT/EP2021/075747
§ 371 (c)(1),
(2) Date: Mar. 16, 2023

(87) PCT Pub. No.: WO2022/063712
PCT Pub. Date: Mar. 31, 2022

(65) Prior Publication Data

US 2023/0400026 A1 Dec. 14, 2023

(30) Foreign Application Priority Data

Sep. 22, 2020 (EP) .................................... 20197445

(51) Int. Cl.
*F04D 7/04* (2006.01)
*F04D 13/08* (2006.01)
(Continued)

(52) U.S. Cl.
CPC ............... *F04D 7/04* (2013.01); *F04D 13/08* (2013.01); *F04D 29/2211* (2013.01); *F04D 29/242* (2013.01); *F05D 2240/306* (2013.01)

(58) Field of Classification Search
CPC ...... F04D 7/04; F04D 29/2211; F04D 29/242; F04D 13/08; F05D 2240/306
See application file for complete search history.

(56) References Cited

U.S. PATENT DOCUMENTS 4,676,718 A * 6/1987 Sarvanne ............ F04D 29/2244 416/185
7,037,069 B2 5/2006 Arnold et al.
(Continued)

FOREIGN PATENT DOCUMENTS

| | | | |
|---|---|---|---|
| EP | 1747377 | A1 | 1/2007 |
| GB | 2175963 | A | 12/1986 |
| JP | 6359845 | B2 | 7/2018 |

OTHER PUBLICATIONS

International Search Report and Written Opinion for International Application No. PCT/EP2021/075747, dated Dec. 3, 2021, 9 pages.

*Primary Examiner* — Elton K Wong
(74) *Attorney, Agent, or Firm* — Buchanan Ingersoll & Rooney PC

(57) ABSTRACT

An open impeller for a submergible pump for pumping abrasive fluids. The impeller has a cover plate, a hub and at least two spirally swept blades, each blade having a leading edge, a trailing edge, and a lower edge extending from the leading edge to the trailing edge and separating the suction and pressure sides of the blade. At least one blade includes a winglet at the lower edge projecting from the suction side, located radially outside an inner radius of the impeller, and extending circumferentially to the trailing edge at the suction side at a maximum radius of the impeller. The lower edge and winglet lower wear surface are configured to be located opposite of and facing a pump wear plate. The inner radius is equal to the largest of the maximum radius of the impeller multiplied by 0.6, and an inlet radius of the impeller multiplied by 1.2.

16 Claims, 7 Drawing Sheets

(51) Int. Cl.
*F04D 29/22* (2006.01)
*F04D 29/24* (2006.01)

(56) References Cited

U.S. PATENT DOCUMENTS

| | | | | |
|---|---|---|---|---|
| 8,439,642 | B2 * | 5/2013 | Scott | F04D 7/045<br>415/206 |
| 2005/0095124 | A1 * | 5/2005 | Arnold | F04D 29/242<br>415/174.4 |
| 2021/0003134 | A1 * | 1/2021 | Sinico | F04D 29/284 |

* cited by examiner

OPEN IMPELLER FOR SUBMERGIBLE PUMP CONFIGURED FOR PUMPING LIQUID COMPRISING ABRASIVE MATTER

CROSS-REFERENCE TO RELATED APPLICATIONS

This is the U.S. National Phase of International Application No. PCT/EP2021/075747, filed Sep. 20, 2021, which claims priority to European Application No. 20197445.8, filed Sep. 22, 2020. The disclosure of each of these applications is incorporated herein by reference in its entirety for all purposes.

TECHNICAL FIELD OF THE INVENTION

The present invention relates generally to the field of pumps configured to pump liquid comprising solid/abrasive matter. Further, the present invention relates specifically to the field of submergible pumps such as wastewater pumps and drainage pumps especially configured for pumping liquid comprising sand and stone material, such as wastewater, drilling water in mining/tunneling applications, surface water on construction sites, etc. i.e. transport and dewatering applications. The present invention relates specifically to an open impeller suitable for said pumps and applications, and to a submergible pump comprising such an open impeller.

The open impeller comprises a cover plate, a centrally located hub and at least two spirally swept blades connected to the cover plate and to the hub, each blade comprising a leading edge adjacent the hub and a trailing edge at the periphery of the impeller and a lower edge, wherein the lower edge extends from the leading edge to the trailing edge and separates a suction side of the blade from a pressure side of the blade, and wherein the lower edge is configured to be facing and located opposite a wear plate of said submergible pump, at least one blade comprising a winglet at the lower edge, wherein the winglet is connected to and projects from the suction side of said at least one blade.

BACKGROUND OF THE INVENTION

In mines, tunneling, quarries, on construction sites, and the like applications, there is almost always a need to remove unwanted water in order to secure a dry enough environment at the working site. In mining/tunneling/quarries applications a lot of drilling water is used when preparing for charging before blasting, and water is also used to prevent dust spreading after the blasting, and if the production water is not removed at least the location of the blast and the lower parts of the mine will become flooded. Surface water and groundwater will also add up to accumulation of unwanted water to be removed. It is customary to use drainage/dewatering pumps to lift the water out of the mine to a settling basin located above ground, and the water is lifted stepwise from the lower parts of the mine to different basins/pits located at different depths of the mine. Each step/lift may for instance be in the range 25-50 meters in the vertical direction, and the length of the outlet conduit, i.e. the transport distance, in each step/lift may for instance be in the range 100-300 meters. In mining applications, a considerable amount of sand and stone material is suspended in the water, in some applications as much as 10%. Wastewater pump stations in addition to sewage also comprises sand, stones, and other abrasive matter, especially originating from surface water.

Thus, there are several applications wherein the pumped media is very abrasive and comprises sand, stones, etc. The applications in question for this patent application are not socalled “vortex pumps”, i.e. pumps having a great distance between the impeller and the wear plate of the volute, but are constituted by pumps having only a small axial gap/clearance between the lower edge of the blades of the impeller and the upper surface of the wear plate of the volute (pump housing), the gap is conventionally less than 1 millimeter. The gap in “vortex pumps” is several centimeters and these pumps are not subject to the problems targeted with the present invention.

In all pump applications there is a pressure difference between the suction side (radially inner side) of the blade and the pressure side (radially outer side) of the blade, due to the design of the impeller and the rotation of the impeller. Most dewatering pumps are socalled high pressure pumps, wherein said pressure difference over the blade may be really high. The pressure difference over the blade, or differential pressure across the lower edge gap, results in a jet-flow of media, i.e. liquid and abrasive matter, from the pressure side to the suction side through the narrow gap between the lower edge of the blade and the wear plate. The jet-flow of pumped media through the gap will wear down the lower edge of the blade, and the resulting increased gap distance will result in rapidly decreasing performance and efficiency, i.e. decreasing head, less pumped flow and higher power consumption.

There are known prior art pumps having socalled winglets at the lower edges of the blades of the impeller and small axial gap between the impeller and the wear plate, for instance document U.S. Pat. No. 7,037,069, in order to increase the length of the gap between the lower edge of the blade and the wear plate/suction cover of the pump volute. Said document comprises an acute angle between the winglet and the center axis of the impeller and the winglet is located at the pressure side of the blade. There are other known impellers having the winglet located at the suction side of the blade, for instance GB2175963 but disclosing a vortex pump/impeller. The prior art solutions disclose use of a winglet all the way of the lower edge of the blade, i.e. from the hub to the periphery, and according to U.S. Pat. No. 7,037,069 the width of the winglet shall decrease towards the periphery of the impeller.

The inventor of the present invention has identified severe problems with known winglet solutions, i.e. the increasing wet area between the lower edge of the impeller and the wear plate due to big winglets causes increasing power consumption and there is a general problem/focus within the technical field of pumps to decrease the power consumption. Thus, the inventor has realized that using winglets all the way from the leading edge to the trailing edge of the blade will have unnecessary large total wet area between the impeller and the wear plate, i.e. the gap area that is perpendicular to the axial distance between the impeller and wear plate, resulting in increasing power consumption of the pump. Thereto the flow area of the channels of the impeller, and the effective blade height, will decrease also at the radially inner part of the blade when using a winglet extending all the way from the leading edge to the trailing edge of the blade. A decreased flow area and decreased effective blade height at the radially inner part of the blade will have negative effect on the efficiency of the impeller. Thus, the above drawbacks and based on the insight that the wear of the blade of the impeller is worse at greater diameter of the impeller due to increasing differential pressure at greater diameter of the impeller and increasing relative speed between the blade and the wear plate at greater diameter of the impeller, the inventor has come up with the present invention.

OBJECT OF THE INVENTION

The present invention aims at obviating the aforementioned disadvantages and failings of previously known impellers and pumps, and at providing an improved impeller and pump. A primary object of the present invention is to provide an improved impeller of the initially defined type that comprises winglets that are configured to prevent wear of the lower edge of the blades and thereby less cross flow over the blade and thereby retained efficiency, i.e. the positive effects of using a winglet are increased, at the same time as the known negative effects of known winglets are decreased and minimized.

SUMMARY OF THE INVENTION

According to the invention at least the primary object is attained by means of the initially defined open impeller and submergible pump having the features defined in the independent claims. Preferred embodiments of the present invention are further defined in the dependent claims.

According to a first aspect of the present invention, there is provided an open impeller of the initially defined type, which is characterized in that said winglet is located radially outside an inner radius (r_inner) of the impeller and extends in the circumferential direction to the trailing edge at the suctions side of the blade located at a maximum radius (r_max) of the impeller, said winglet having a lower wear surface configured to be facing and located opposite the wear plate of the submergible pump, wherein said inner radius (r_inner) is equal to the largest of:

- the maximum radius (r_max) of the impeller multiplied by 0.6, and
- an inlet radius (r_inlet) of the impeller multiplied by 1, 2, wherein the inlet radius (r_inlet) is taken at the interface between the leading edge of the blade and the lower edge of the blade at the suction side of the blade.

According to a second aspect of the present invention, there is provided a submergible pump comprising such an open impeller.

Thus, the present invention is based on the insight that the winglet shall not start at the leading edge of the blade, i.e. at the inlet of the pump volute, in order not to have negative effect on the flow of pumped liquid at the inner part of the channels of the impeller, and based on the insight that the wear is worse at greater diameter of the impeller and thereby the need for winglet increases at greater diameter of the impeller, at the same time as the wet area of the gap shall be minimized in order to minimize the power consumption. A longer gap where the differential pressure is greatest will result in less cross flow and less wear.

According to various embodiments of the present invention, the width (W) of the lower wear surface of the winglet, taken along the radius of the impeller, is increasing from zero at said inner radius (r_inner) to a max width (W_max) at the trailing edge at the suction side of the blade. Thereby the added gap width by means of the winglet, in addition to the original gap width of the lower edge of the blade, is increasing together with increasing radius and thereby the cross flow and wear is minimized as most where the differential pressure is as largest.

According to various embodiments of the present invention, the blade of the impeller has a height (H) at the max width (W_max) of the winglet, wherein the ratio between the max width (W_max) of the lower wear surface of the winglet and the height (H) of the blade is equal to or more than 0.4 and equal to or less than 0.6, when said height (H) is more than 50 mm, and is equal to or more than 0.5 and equal to or less than 0.8, when said height (H) is equal to or less than 50 mm. Thereby, the width of the winglet is adapted to the differential pressures the different impellers are configured to handle, i.e. impellers configured to deliver higher pressure/head, i.e. having less effective blade height and higher differential pressure, has wider winglets than impellers configured to deliver lower pressure/head, i.e. having bigger effective blade height and lower differential pressure.

According to various embodiments of the present invention, the thickness (T) of the winglet is equal to or more than 2.5 mm and equal to or less than 7 mm. According to various embodiments of the present invention, the thickness (T) of the winglet is largest at the max width (W_max) of the lower wear surface of the winglet. Thereby the most material of the winglet is added where the wear is the worse and where the channel of the impeller has the largest flow area, i.e. less effect on the flow area of the channel.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

The present invention relates specifically to the field of submergible pumps especially configured for pumping liquid comprising abrasive/solid matter, such as water comprising sand and stone material. The submergible pumps are especially wastewater pumps and drainage/dewatering pumps. The present invention relates specifically to an open impeller suitable for such pumps and such applications.

Figure 1:
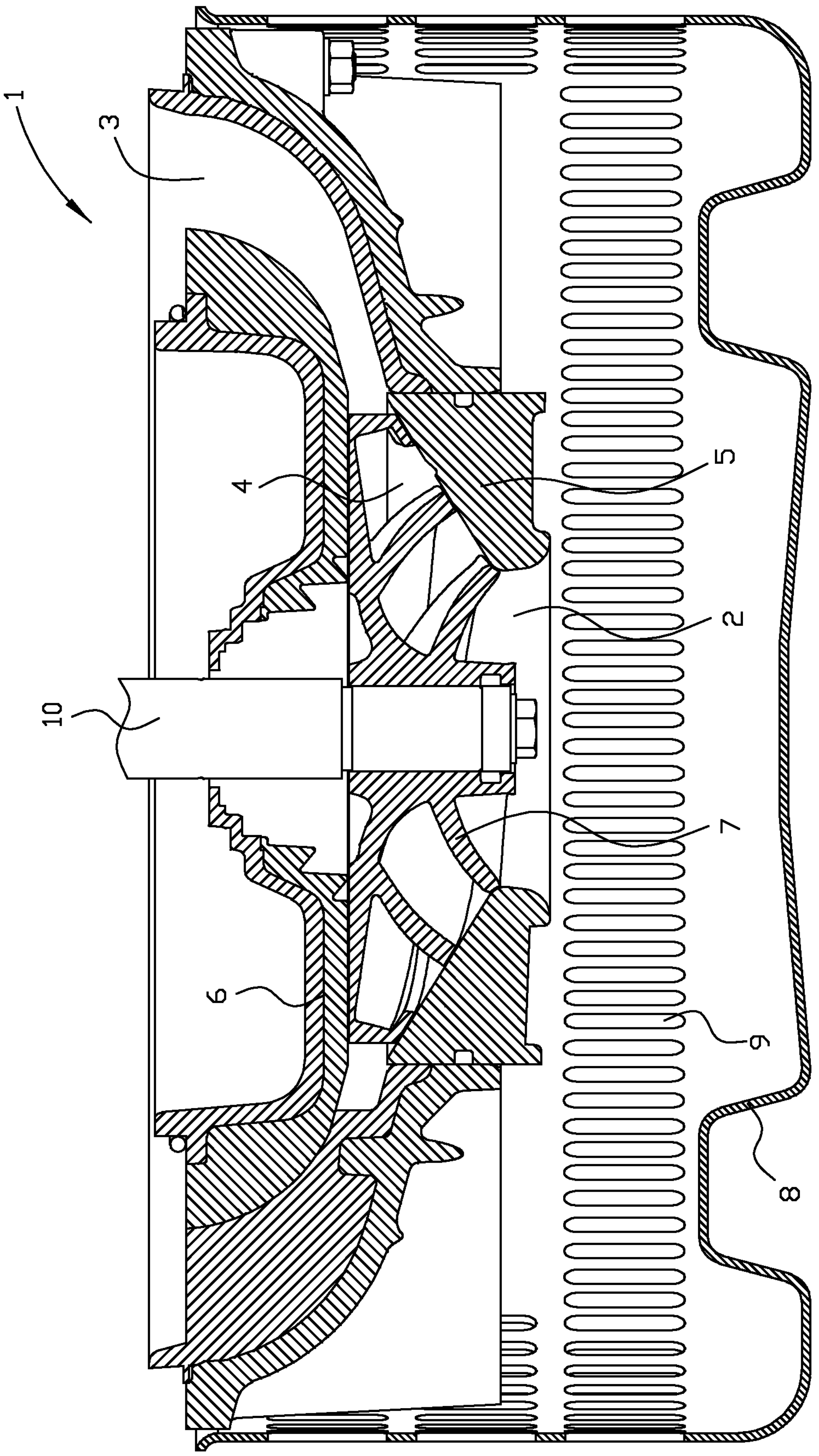
FIG. 1 is a schematic cross-sectional side view of the hydraulic unit of an inventive submergible pump, i.e. a drainage pump, comprising an inventive open impeller.

Reference is initially made to FIG. 1, disclosing a schematic illustration of a hydraulic unit of a submergible pump, generally designated 1. A general submergible pump will be described with reference to FIG. 1, even though FIG. 1 actually discloses a hydraulic unit of a drainage pump the structural elements is the same for a wastewater pump. The submergible pump 1 is hereinafter referred to as pump.

The hydraulic unit of the pump 1 comprises an inlet 2, an outlet 3 and a volute 4 located between said inlet 2 and said outlet 3, i.e. the volute 4 is located downstream the inlet 2 and upstream the outlet 3. The volute 4 is partly delimited by a wear plate 5 that encloses the inlet 2. The volute 4 is also delimited by an intermediate wall 6 separating the volute 4 from the drive unit (removed from FIG. 1) of the pump 1. Said volute 4 is also known as pump chamber and said wear plate 5 is also known as suction cover. In some applications, the outlet 3 of the hydraulic unit also constitutes the outlet of the pump 1, and in other applications the outlet 3 of the hydraulic unit is connected to a separate outlet of the pump 1. The outlet of the pump 1 is configured to be connected to an outlet conduit (not shown). Thereto the pump 1 comprises an open impeller, generally designated 7, wherein the impeller 7 is located in the volute 4, i.e. the hydraulic unit of the pump 1 comprises an impeller 7.

The hydraulic unit of a drainage pump thereto comprises an inlet strainer 8 having perforations or holes 9, wherein the inlet strainer 8 is configured to prevent larger objects from reaching the inlet 2 and the volute 4. Such larger objects may otherwise jam or clog the impeller 7.

The drive unit of the pump 1 comprises an electric motor arranged in a liquid tight pump housing, and a drive shaft 10 extending from the electric motor through the intermediate wall 6 and into the volute 4. The impeller 7 is connected to and driven in rotation by the drive shaft 10 during operation of the pump 1, wherein liquid is sucked into said inlet 2 and pumped out of said outlet 3 by means of the rotating impeller 7 when the pump 1 is active. The pump housing, the wear plate 5, the impeller 7, and other essential components, are preferably made of metal, such as aluminum and steel. The electric motor is powered via an electric power cable extending from a power supply, and the pump 1 comprises a liquid tight lead-through receiving the electric power cable.

According to preferred embodiments, the pump 1, more precisely the electric motor, is operatively connected to a control unit, such as an Intelligent Drive comprising a Variable Frequency Drive (VFD). Thus, said pump 1 is configured to be operated at a variable operational speed [rpm], by means of said control unit. According to preferred embodiments, the control unit is located inside the liquid tight pump housing, i.e. it is preferred that the control unit is integrated into the pump 1. The control unit is configured to control the operational speed of the pump 1. According to alternative embodiments the control unit is an external control unit, or the control unit is separated into an external sub-unit and an internal sub-unit. The operational speed of the pump 1 is more precisely the rpm of the electric motor and of the impeller 7 and correspond/relate to a control unit output frequency.

The components of the pump 1 are usually cold down by means of the liquid/water surrounding the pump 1. The pump 1 is designed and configured to be able to operate in a submerged configuration/position, i.e. during operation be located entirely under the liquid surface. However, it shall be realized that the submersible pump 1 during operation must not be entirely located under the liquid surface but may continuously or occasionally be fully or partly located above the liquid surface. In dry installed applications the submergible pump 1 comprises dedicated cooling systems.

The present invention is based on a new and improved open impeller 7, that is configured to be used in pumps 1 pumping abrasive media, for instance water or wastewater/sewage comprising sand and stones. Impellers 7 wear quite fast in such installations due to the solid/abrasive matter in the pumped liquid and conventionally need to be replaced every 7 weeks in rough conditions because of accelerating decrease in efficiency of the pump 1 when the impeller 7 wear down. Tests have been performed, and the present invention will prolong the need for replacement with about 30-50%, in relation to conventional impellers not having the inventive winglets.

Figure 2:
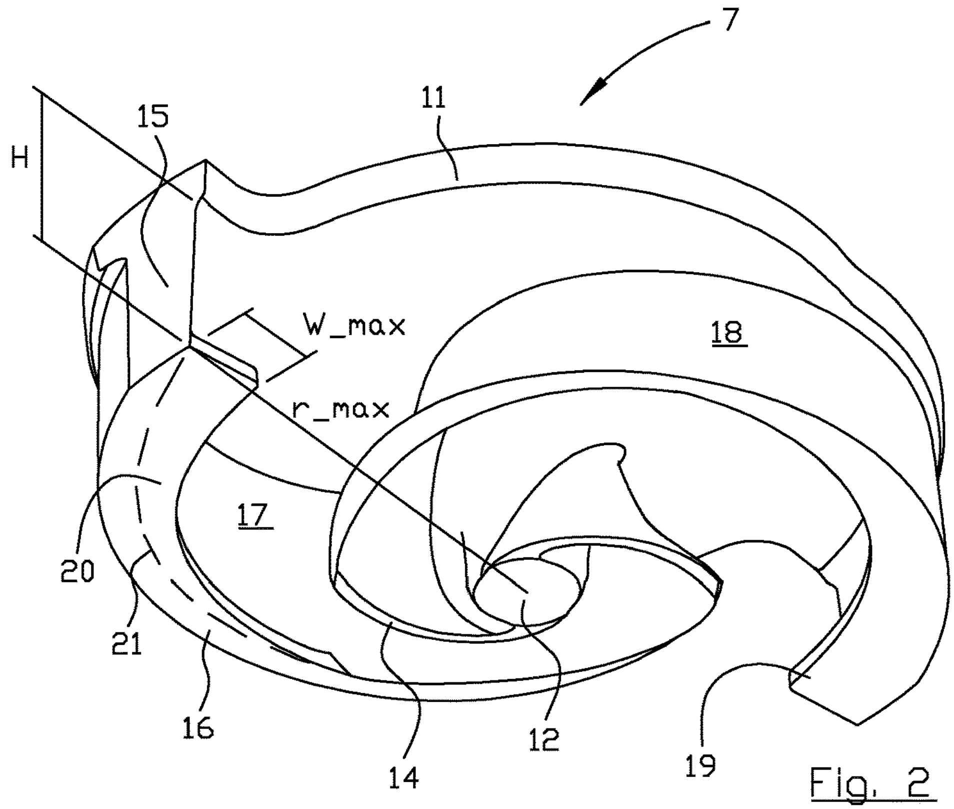
FIG. 2 is a schematic perspective view from below of an open impeller having two blades, wherein the impeller is an example of an impeller for a wastewater pump configured for lower pressure and higher volume.
Figure 3:
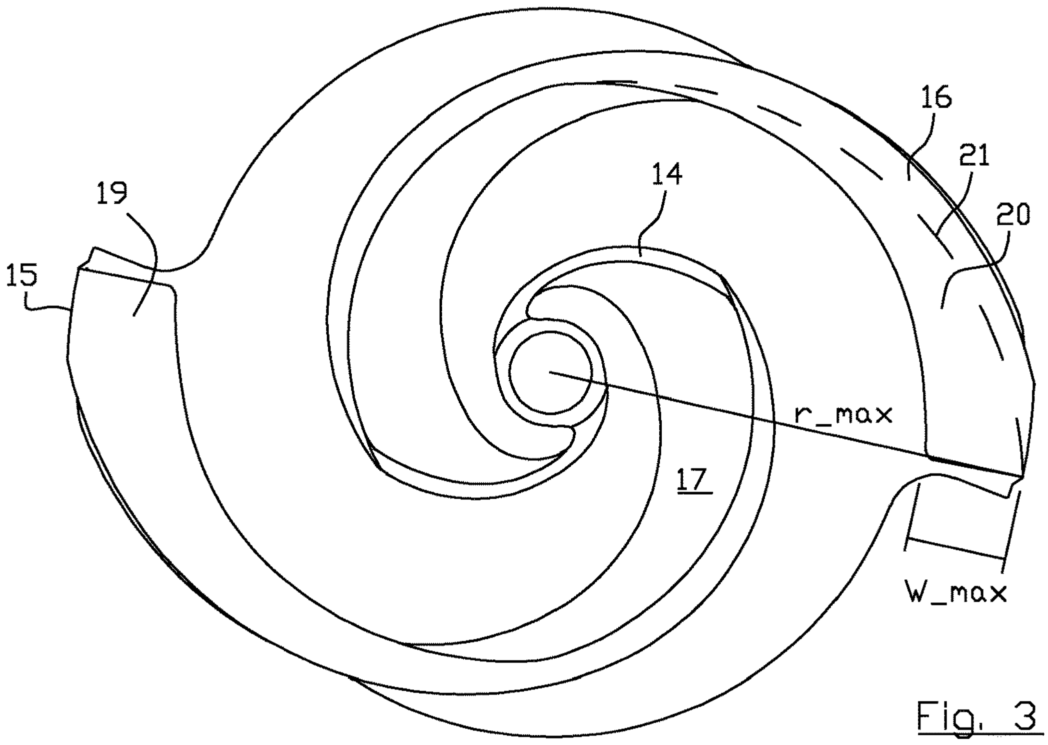
FIG. 3 is a schematic view from below of the impeller according to FIG. 2.
Figure 4:
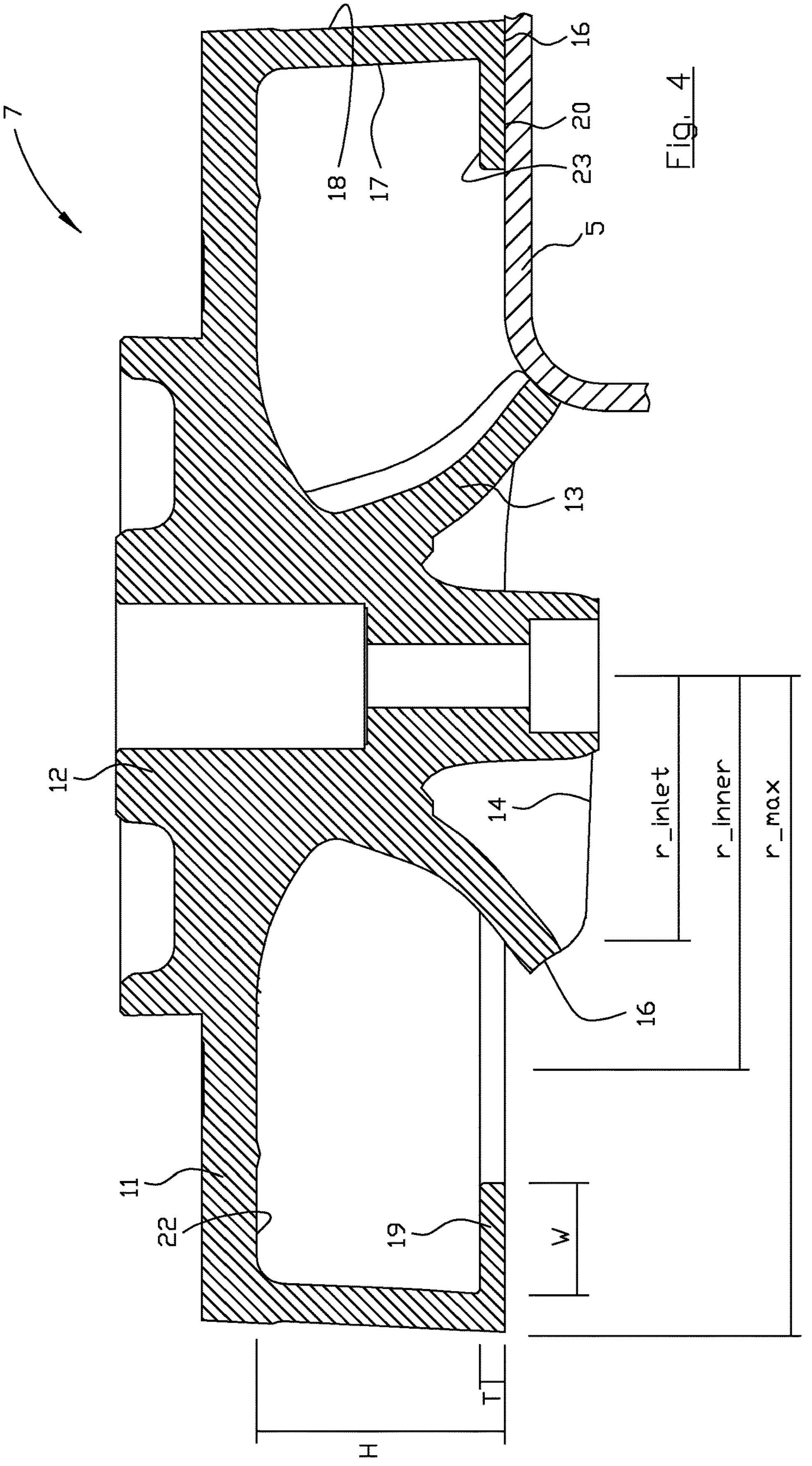
FIG. 4 is a schematic cross-sectional side view of the impeller according to FIGS. 2 and 3.
Figure 5:
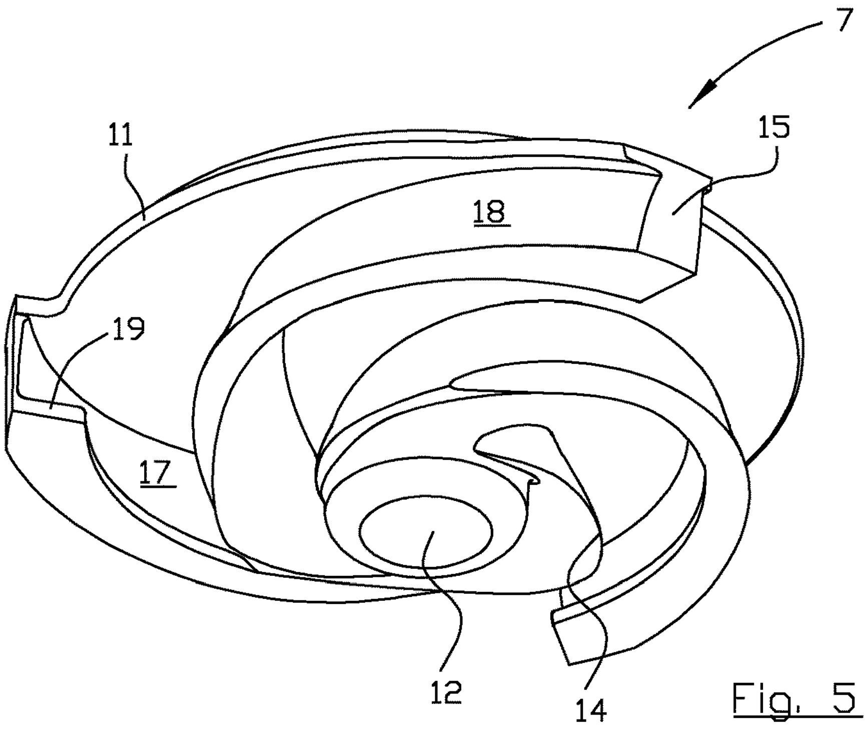
FIG. 5 is a schematic perspective view from below of an open impeller having three blades, wherein the impeller is an example of an impeller for a drainage pump configured for medium pressure and medium volume.
Figure 6:
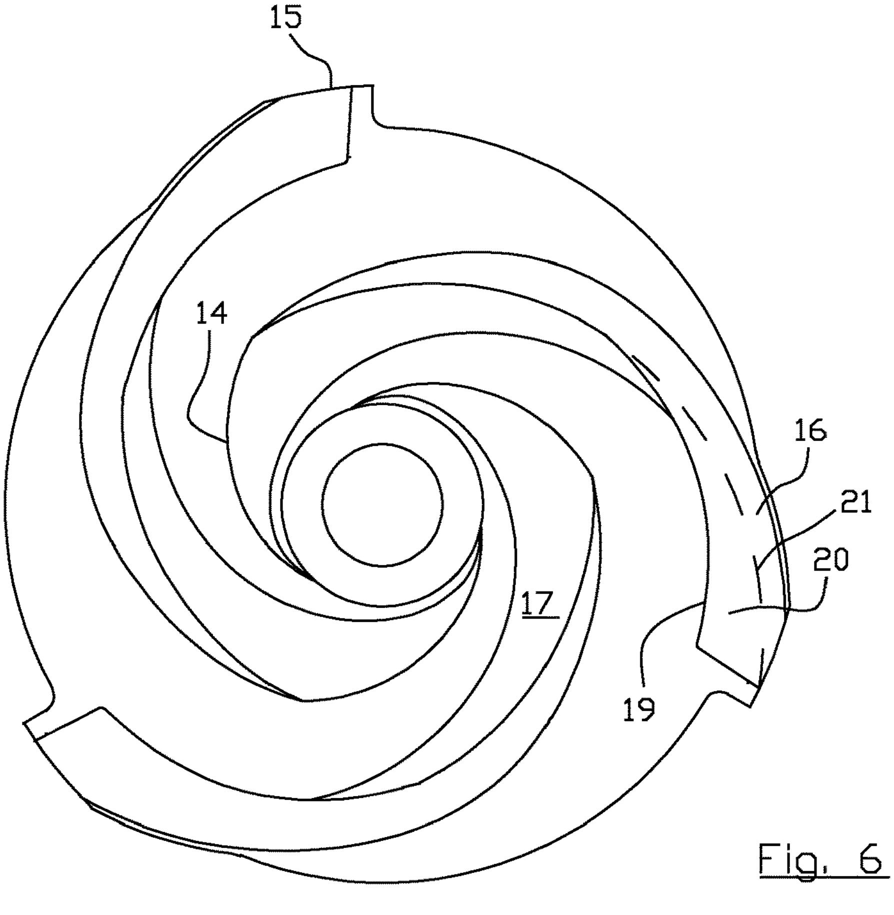
FIG. 6 is a schematic view from below of the impeller according to FIG. 5.
Figure 7:
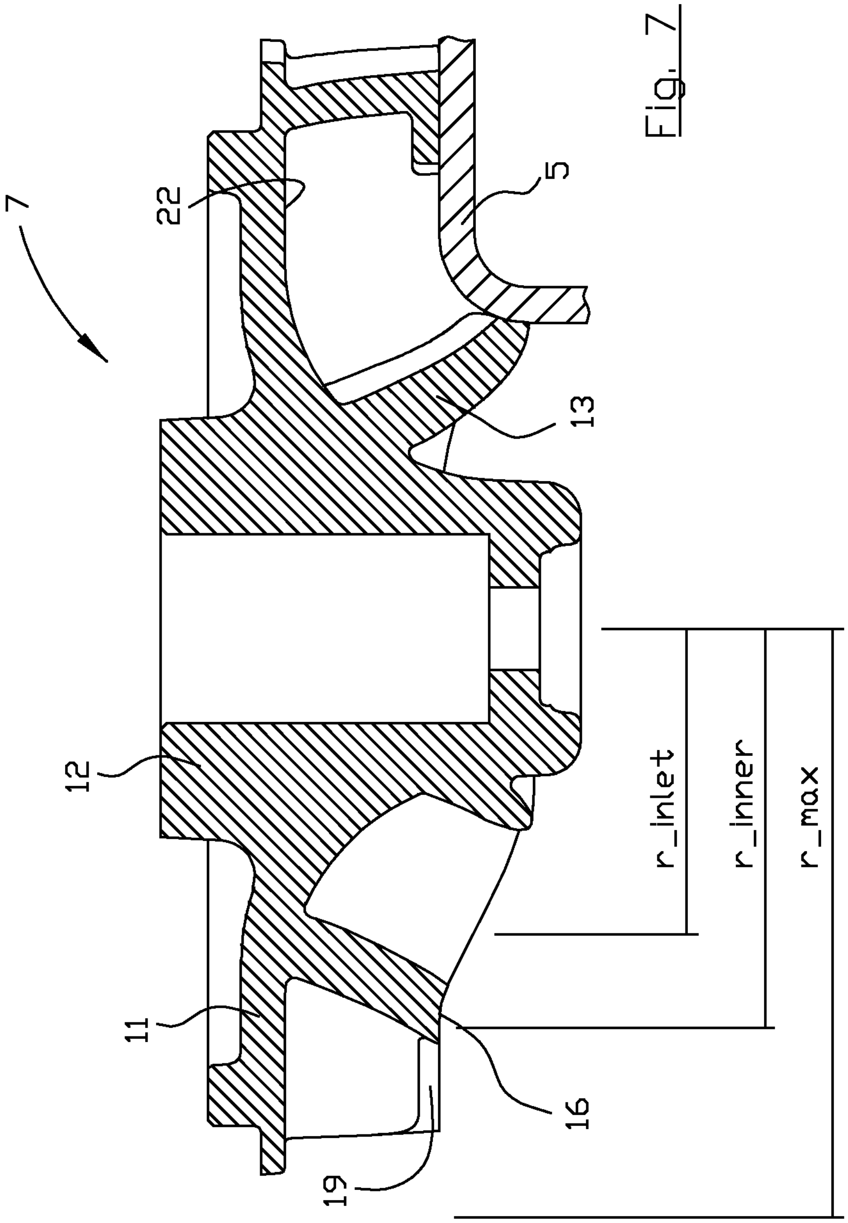
FIG. 7 is a schematic cross-sectional side view of the impeller according to FIGS. 5 and 6.
Figure 8:
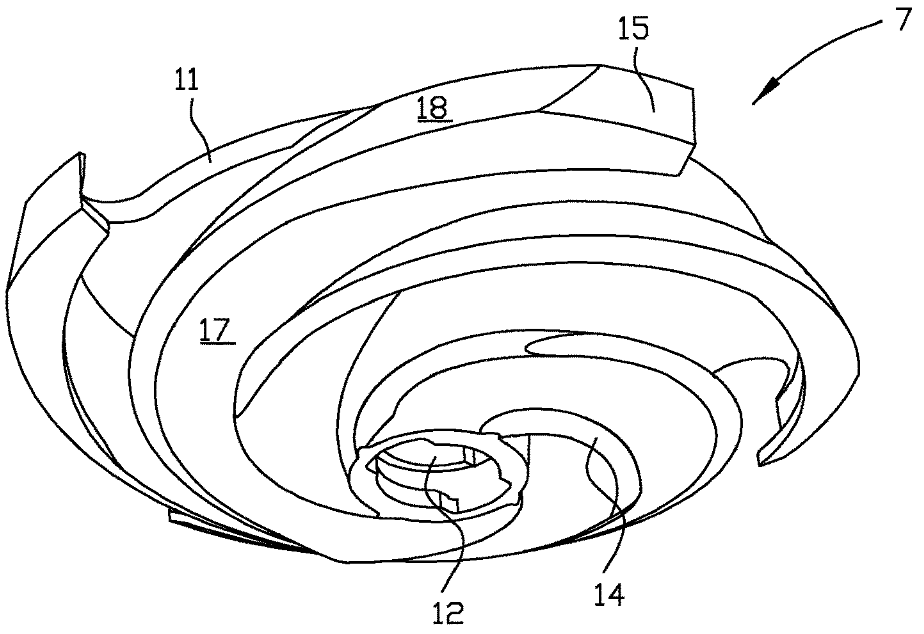
FIG. 8 is a schematic perspective view from below of an open impeller having four blades, wherein the impeller is an example of an impeller for a drainage pump configured for higher pressure and lower volume.
Figure 9:
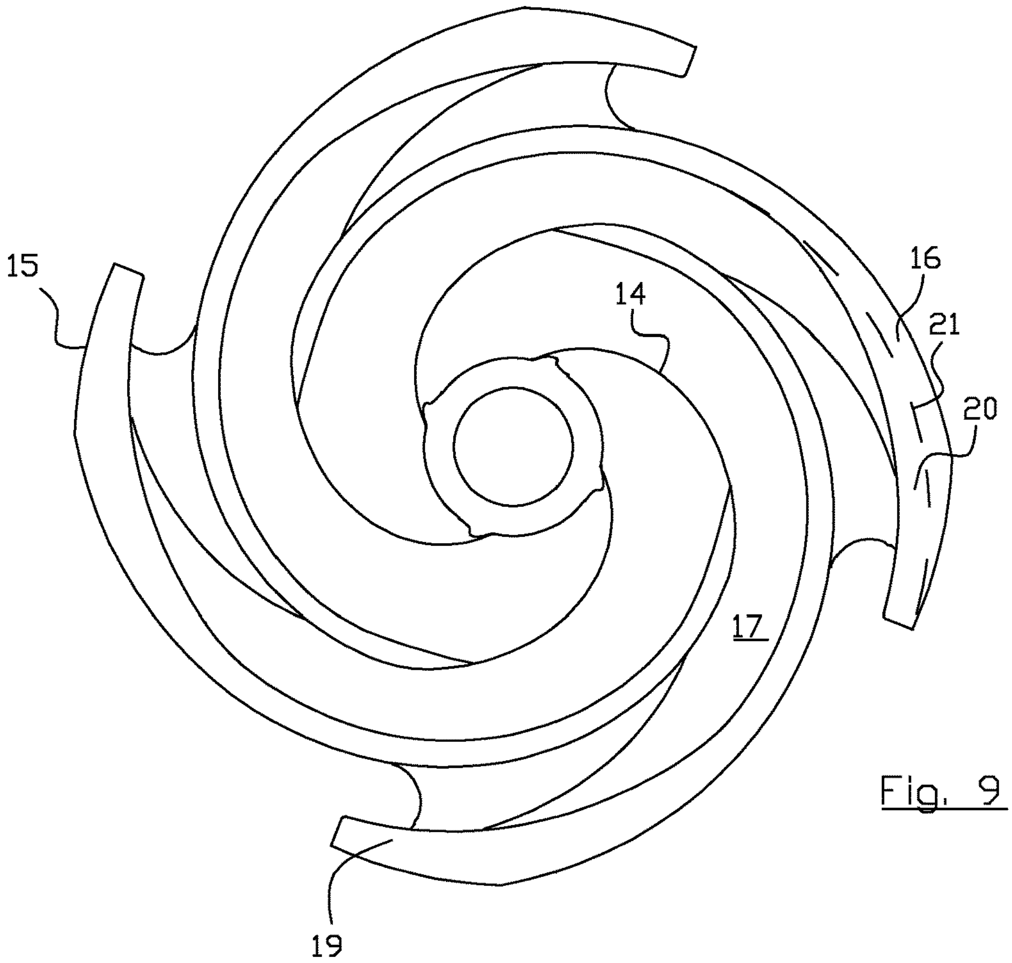
FIG. 9 is a schematic view from below of the impeller according to FIG. 8.
Figure 10:
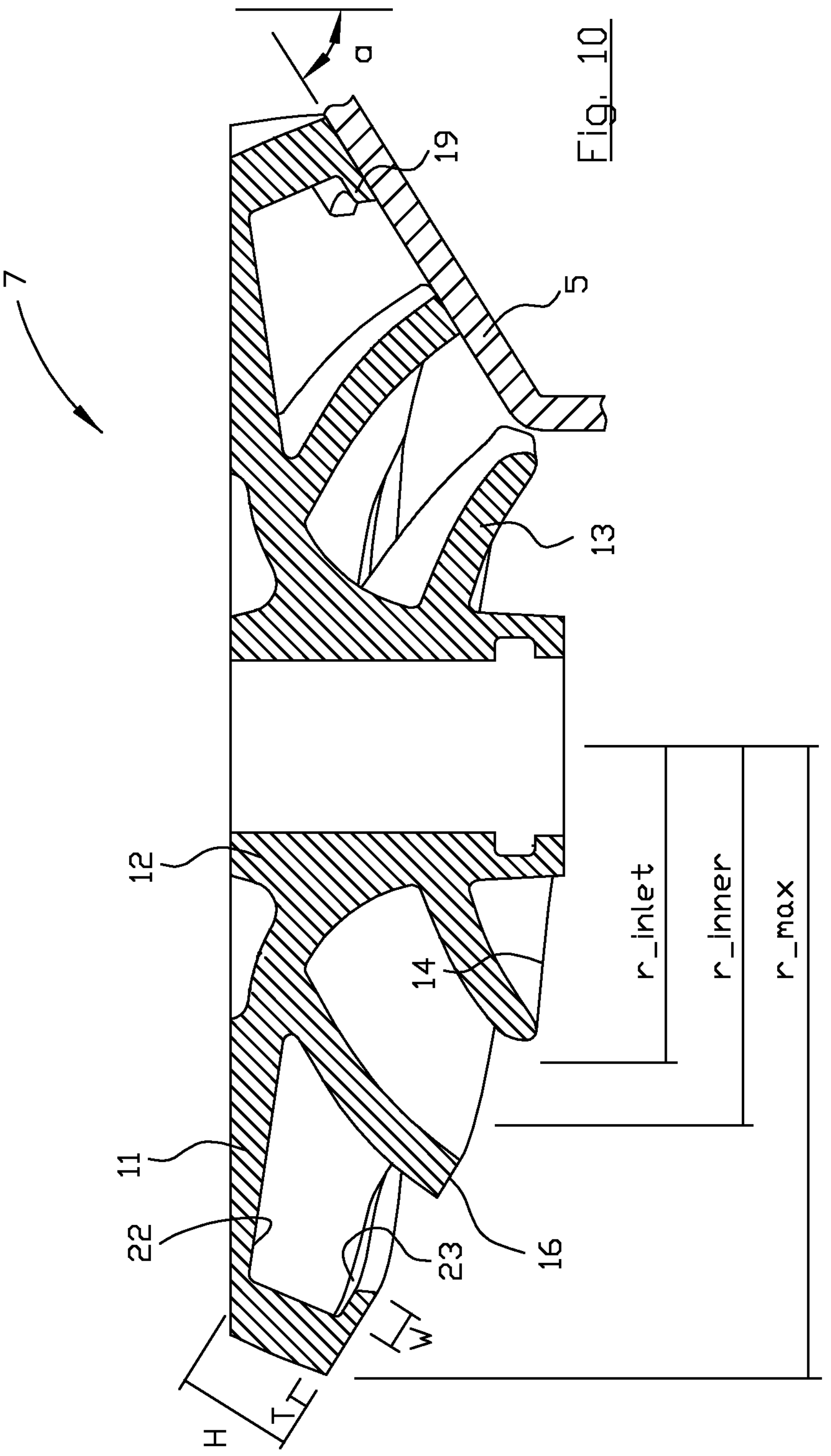
FIG. 10 is a schematic cross-sectional side view of the impeller according to FIGS. 8 and 9.

Reference is now made to FIGS. 2-10 disclosing different examples of the inventive impeller 7, FIGS. 2-4 disclose a first example impeller, FIGS. 5-7 disclose a second example impeller and FIGS. 8-10 disclose a third example impeller. The below description is valid for all inventive impellers 7, irrespective of which figure is referred to, if nothing else is mentioned.

The impeller 7 comprises a cover plate 11, a centrally located hub 12 and at least two spirally swept blades 13 connected to the cover plate 11 and to the hub 12. In FIGS. 2-4 the impeller 7 comprises two blades 13, in FIGS. 5-7 the impeller 7 comprises three blades 13, and in FIGS. 8-10 the impeller 7 comprises four blades 13. The blades 13 are equidistant located around the hub 12.

The blades 13 are swept, seen from the hub 12 towards the periphery of the impeller 7, in a direction opposite the direction of rotation of the impeller 7 during normal (liquid pumping) operation of the pump 1. Thus, seen from below, i.e. FIGS. 3, 6 and 9, the direction of rotation of the impellers 7 during normal operation is counterclockwise.

Each blade 13 comprises a leading edge 14 adjacent the hub 12 and a trailing edge 15 at the periphery of the impeller 7. The leading edge 14 of the impeller 7 is located upstream the trailing edge 15, wherein two adjacent blades 13 together defines a channel extending from the leading edges 14 to the trailing edges 15. The leading edge 14 is located at the inlet 2 of the hydraulic unit, and the leading edge 14 is spirally swept from the hub outwards, in the same direction as the blade 13. During operation, the leading edges 14 grabs hold of the liquid, the channels accelerate the liquid and the liquid leaves the impeller 7 at the trailing edges 15. Thereafter the liquid is guided by the volute 4 of the hydraulic unit towards the outlet 3. Thus, the liquid is sucked into the impeller 7 and pressed out of the impeller 7. Said channels are also delimited by the cover plate 11 of the impeller 7 and by the wear plate 5 of the volute 4. The diameter of the impeller 7 and the shape and configuration of the channels/blades determines the pressure build up in the liquid and the pumped flow.

Each blade 13 also comprises a lower edge 16, wherein the lower edge 16 extends from the leading edge 14 to the trailing edge 15 and separates a suction side/surface 17 of the blade 13 from a pressure side/surface 18 of the blade 13. The lower edge 16 is configured to be facing and located opposite the wear plate 5 of the pump 1. Thus, the suction side 17 of one blade 13 is located opposite the pressure side 18 of an adjacent blade 13. The leading edge 14 and the trailing edge 15 also separates the suction side 17 from the pressure side 18. The leading edge 14 is preferably rounded.

At least one blade 13 comprises a winglet 19 at the lower edge 16 of the blade 13, wherein the winglet 19 is connected to and projects from the suction side 17 of the blade 13. The winglet 19 has a lower wear surface 20 configured to be facing and located opposite the wear plate 4 of the pump 1. The lower wear surface 20 of the winglet 19 is preferably in flush with the lower edge 16 of the blade 13.

It is essential that said winglet 19 is located radially outside an inner radius (r_inner) of the impeller 7 and extends in the circumferential direction to the trailing edge 15 at the suctions side 17 of the blade 13 located at a maximum radius (r_max) of the impeller 7. Thus, the invention is based on the insight that the start of the winglet 19, i.e. the inner radius (r_inner), shall be distanced from the inlet 2, i.e. be distanced from the interface between the leading edge 14 of the blade 13 and the lower edge 16 of the blade 13. The inner radius (r_inner) is equal to the largest of:

the maximum radius (r_max) of the impeller 7 multiplied by 0.6, and an inlet radius (r_inlet) of the impeller 7 multiplied by 1.2, wherein the inlet radius (r_inlet) is taken at the interface between the leading edge 14 of the blade 13 and the lower edge 16 of the blade 13 at the suction side 17 of the blade 13.

In FIGS. 3, 6 and 9, the interface between the lower wear surface 20 of the winglet 19 and the lower edge 16 of the blade 13 is disclosed by means of a broken line 21, and it is clear that the winglets 19 starts at a distance from the leading edge 14.

The technical function of the winglet 19 is to increase the width of the gap between the lower edge 16 of the blade 13 and the wear plate 5, in order to decrease the cross flow of liquid and abrasive matter from the pressure side 18 to the suction side 17 and thereby decrease the wear of the blade 13. However, an increasing width of the gap will also increase the wet area of the gap leading to increased frictional forces. The wet area of the gap is the area of the part of the blade 13 that located opposite and is facing the wear plate 5. By having the start of the winglet 19 distanced from the leading edge 14, the width of the gap, i.e. the width of the winglet 19, at larger diameter of the impeller 7 may be increased without increasing the wet area of the gap, and by increasing the width of the gap at larger diameter of the impeller 7, the impeller 7 will be more resistant to wear.

Preferably all blades 13 of the impeller 7 are provided with winglets 19 of the same dimensions in order to have a balanced impeller 7.

According to various embodiments, the width (W) of the lower wear surface 20 of the winglet 19, taken along the diameter of the impeller 7, is increasing from zero at said inner radius (r_inner) to a max width (W_max) at the trailing edge 15 at the suction side 17 of the blade 13. The blade 13 of the impeller 7 has a height (H) at the max width (W_max) of the winglet 19, and the height (H) is measured along a line extending perpendicular to an imaginary line that coincides with the lower edge 16 of the blade 13, and is measured between said imaginary line and the imaginary interface between the suction side 17 of the blade 13 and the lower surface 22 of the cover plate 11. The height of the blade may vary depending on the distance from the centre axis of the impeller 7.

According to preferred embodiments, the ratio between the max width (W_max) of the lower wear surface 20 of the winglet 19 and the height (H) of the blade 13 is equal to or more than 0.4 and equal to or less than 0.6, when said height (H) is more than 50 mm. This is for instance impellers 7 configured for drainage pumps.

According to other preferred embodiments, the ratio between the max width (W_max) of the lower wear surface 20 of the winglet 19 and the height (H) of the blade 13 is equal to or more than 0.5 and equal to or less than 0.8, when said height (H) is equal to or less than 50 mm. This is for instance impellers 7 configured for wastewater pumps.

The max width (W_max) of the lower wear surface 20 of the winglet 19 is measured in parallel with said lower wear surface 20, and is measured from the imaginary interface between the suction side 17 of the blade 13 and the upper surface 23 of the winglet 19. The upper side 23 of the winglet 19 is opposite the lower wear surface 20 of the winglet 19.

According to various embodiments a thickness (T) of the winglet 19 is equal to or more than 2.5 mm and equal to or less than 7 mm, preferably equal to or more than 3 mm and equal to or less than 6 mm. A too thin winglet 19 will be subject to deformation and a too thick winglet 19 will have negative effect on the effective flow area of the channel of the impeller 7 and the weight of the impeller 7 and thereby the efficiency of the pump 1.

According to preferred embodiments, the thickness (T) of the winglet 19 is largest at the max width (W_max) of the lower wear surface 20 of the winglet 19, at the maximum radius (r_max) of the impeller 7. It is also preferred that the thickness (T) of the winglet 19 is increasing in the circumferential direction along the winglet 19. Thus, the winglet 19 is thicker at the most outer part of the winglet 19, i.e. in the area wherein the winglet 19 is subject to most wear and forces.

Another way to define the thickness (T) of the winglet 19 is in relation to the height (H) of the blade 13. Accordingly the ratio between a thickness (T) of the winglet 19 and the height (H) of the blade 13, taken at the max width (W_max) of the lower wear surface 20 of the winglet 19, is equal to or more than 0.05 and equal to or less than 0.3.

For all impellers 7 the angle (a) between the lower wear surface 20 of the winglet 19 and a centre axis of the impeller 7 is obtuse, i.e. greater than 45 degrees.

The distance between the lower wear surface 20 of the winglet 19 and the wear plate 5 is equal to or more than 0.1 mm and equal to or less than 0.5 mm, preferably equal to or more than mm and preferably equal to or less than 0.4 mm.

FEASIBLE MODIFICATIONS OF THE INVENTION

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicate mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. An open impeller for a submergible pump configured for pumping liquid comprising abrasive matter, the impeller comprising a cover plate, a centrally located hub and at least two spirally swept blades connected to the cover plate and to the hub;

each blade comprising a leading edge adjacent the hub, a trailing edge at the periphery of the impeller, and a lower edge, the lower edge extending from the leading edge to the trailing edge and separating a suction side of the blade from a pressure side of the blade, the lower edge configured to be located opposite of and facing a wear plate of said submergible pump;

at least one blade having a winglet at the lower edge, wherein the winglet is connected to and projects from the suction side of said at least one blade, said winglet located radially outside an inner radius (r_inner) of the impeller, extending in the circumferential direction to the trailing edge at the suction side of the blade located at a maximum radius (r_max) of the impeller, and having a lower wear surface configured to be located opposite of and facing the wear plate of the submergible pump, wherein said inner radius (r_inner), measured at the interface between the leading edge of the blade and the lower edge of the blade at the suction side of the blade, is equal to the largest of:

the maximum radius (r_max) of the impeller multiplied by 0.6, and an inlet radius (r_inlet) of the impeller multiplied by 1.2.

2. The open impeller of claim 1, wherein the lower wear surface of the winglet is flush with the lower edge of the blade.

3. The open impeller of claim 1, wherein a width (N) of the lower wear surface of the winglet, taken along a diameter of the impeller, increases from zero at said inner radius to a maximum width (W_max) at the trailing edge at the suction side of the blade.

4. The open impeller of claim 3, wherein the at least one blade of the impeller has a height (H) of more than 50 mm at the max width (W_max) of the winglet measured along a line extending perpendicular to an imaginary line that coincides with the lower edge of the blade, measured between said imaginary line and an imaginary interface between the suction side of the blade and a lower surface of the cover plate, wherein a ratio between the max width (W_max) of the lower wear surface of the winglet, and the height (H) of the blade is equal to or more than 0.4 and equal to or less than 0.6.

5. The open impeller of claim 4, wherein the max width (W_max) of the lower wear surface of the winglet is measured in parallel with said lower wear surface, and is measured from an imaginary interface between the suction side of the blade and an upper surface of the winglet.

6. The open impeller of claim 3, wherein the at least one blade of the impeller has a height (H) equal to or less than 50 mm at the max width (W_max) of the winglet measured along a line extending perpendicular to an imaginary line that coincides with the lower edge of the blade, measured between said imaginary line and an imaginary interface between the suction side of the blade and a lower surface of the cover plate, wherein a ratio between the max width (W_max) of the lower wear surface of the winglet, and the height (H) of the blade is equal to or more than 0.5 and equal to or less than 0.8.

7. The open impeller of claim 6, wherein the max width (W_max) of the lower wear surface of the winglet is measured in parallel with said lower wear surface, and is measured from an imaginary interface between the suction side of the blade and an upper surface of the winglet.

8. The open impeller of claim 3, wherein the winglet has a thickness (T) that is equal to or more than 2.5 mm and equal to or less than 7 mm.

9. The open impeller of claim 8, wherein the winglet thickness (T) is equal to or more than 3 mm and equal to or less than 6 mm.

10. The open impeller of claim 8, wherein the winglet thickness (T) is largest at the max width (W_max) of the lower wear surface of the winglet at the maximum radius (r_max) of the impeller.

11. The open impeller of claim 8, wherein the winglet thickness (T) increases in a circumferential direction along the winglet.

12. The open impeller of claim 3, wherein the ratio between a thickness (T) of the winglet and a height (H) of the blade, taken at the max width (W_max) of the lower wear surface of the winglet, is equal to or more than 0.05 and equal to or less than 0.3.

13. The open impeller of claim 1, wherein the lower wear surface of the winglet is disposed at an obtuse angle ($\alpha$) relative to a centre axis of the impeller.

14. A submergible pump configured for pumping liquid comprising abrasive matter, the submergible pump comprising the open impeller of claim 1 and a hydraulic unit having an inlet, an outlet and a volute located between said inlet and said outlet, the volute partly delimited by a wear plate of the submergible pump, wherein the wear plate encloses the inlet.

15. The submergible pump of claim 14, wherein the distance between the lower wear surface of the winglet and the wear plate is equal to or more than 0.1 mm and equal to or less than 0.5 mm.

16. The submergible pump of claim 15, wherein the distance between the lower wear surface of the winglet and the wear plate is equal to or more than 0.15 mm and equal to or less than 0.4 mm.

* * * * *